United States Patent [19]
Singh et al.

[11] Patent Number: 6,068,800
[45] Date of Patent: *May 30, 2000

[54] PRODUCTION OF NANO PARTICLES AND TUBES BY LASER LIQUID INTERACTION

[75] Inventors: Jogender Singh; Eric Whitney; Paul E. Denney, all of State College, Pa.

[73] Assignee: The Penn State Research Foundation, University Park, Pa.

[*] Notice: This patent is subject to a terminal disclaimer.

[21] Appl. No.: 09/055,835

[22] Filed: Apr. 6, 1998

Related U.S. Application Data

[63] Continuation-in-part of application No. 08/708,425, Sep. 5, 1996, Pat. No. 5,770,126
[60] Provisional application No. 60/003,349, Sep. 7, 1995.
[51] Int. Cl.[7] .............................. B29B 9/00; B05B 17/04
[52] U.S. Cl. .................................. 264/8; 264/10; 75/333; 75/336
[58] Field of Search .................................. 264/8, 10, 12; 75/333, 336

[56] References Cited

U.S. PATENT DOCUMENTS

| | | | |
|---|---|---|---|
| 4,889,665 | 12/1989 | Uda et al. | 264/10 |
| 5,344,676 | 9/1994 | Kim et al. | 427/468 |
| 5,472,749 | 12/1995 | Dravid et al. | 264/10 |
| 5,618,475 | 4/1997 | Johnson et al. | 264/10 |
| 5,665,277 | 9/1997 | Johnson et al. | 264/10 |
| 5,736,073 | 4/1998 | Wadley | 264/10 |

OTHER PUBLICATIONS

Synthesis and Characterization of Diamond Growth. Singh, J., Internl. Confer. on Beam Processing of Advance Materials, The Minerals, Metals & Materials Society, 1993.

*Primary Examiner*—Mary Lynn Theisen
*Attorney, Agent, or Firm*—Thomas J. Monahan

[57] ABSTRACT

The present invention is a process and apparatus for producing nano-scale particles using the interaction between a laser beam and a liquid precursor solution. There are two embodiments. The first embodiment includes the use of a solid substrate during the laser-liquid interaction. In this embodiment the laser beam is directed at the solid substrate which is immersed in the liquid precursor solution and rotating. The second embodiment includes the use of a plasma during the laser-liquid interaction. In the second embodiment, a mixture of a liquid precursor and a carrier gas is injected into a laser beam. Injection of the mixture can be performed either perpendicular or parallel to the laser beam. The apparatus for injecting the liquid precursor and carrier gas into the laser beam includes a plasma nozzle designed to allow the laser beam to enter the plasma nozzle so that the laser beam may irradiate what is flowing through the plasma nozzle to create a plasma flow. The carrier gas allows for the formation of a plasma by its interaction with the laser beam. The liquid precursor is allowed to atomize into fine droplets. These fine droplets are exposed to the laser beam along with the plasma. The photon energy from laser beam and plasma energy induce the breaking of the molecular bond of the liquid precursor which results in the formation of ultra-fine elemental powders.

6 Claims, 14 Drawing Sheets

PRODUCTION OF NANO PARTICLES AND TUBES BY LASER LIQUID INTERACTION

CROSS-REFERENCE TO RELATED APPLICATIONS

This application is a continuation-in-part of U.S. application Ser. No. 08/708,425, filed Sep. 5, 1996, now U.S. Pat. No. 5,770,126. This application also claims the benefit of U.S. Provisional Application No. 60/003,349 filed Sep. 7, 1995.

GOVERNMENT SPONSORSHIP

This invention was made with Government support under Contract No. N00039-C-92-0100 awarded by the U.S. Department of the Navy. The Government has certain rights in the invention.

BACKGROUND

The production of sub-micrometer (100 nm<diameter<1 $\mu$m) and nano-scale (1 nm<diameter<100 nm) particles has received attention in both basic science and advanced technology research. There is a growing interest in producing clusters and nano-scale crystalline material for potential catalytic, sensor, aerosol, filter, biomedical, magnetic, dielectric, magnetic structural, opto-electronic structural, ceramics and metallurgical applications. This is because nano-scale particles exhibit volume effects and surface effects absent in the same material with dimensions in the micrometer range. Nano-scale particles have unique physical properties (e.g. optical, dielectric, magnetic, mechanical), transport properties (e.g., thermal, atomic diffusion) and processing characteristics (e.g., faster sintering kinetics, super-plastic forming).

The nano-scale particles provide a narrow size distribution which is required to obtain a uniform material response. Materials such as paints, pigments, electronic inks and ferrofluids as well as advanced functional and structural ceramics require that the particles be uniform in size and stable against agglomeration. Fine particles, particularly nano-scale particles with significant surface area often agglomerate to minimize total surface or interfacial energy of the system. Although the process of using solution chemistry can be a practical route for the synthesis of both submicrometer and nano-scale particles of many materials, issues such as the control of size, distribution of particles, morphology and crystallinity, particle agglomeration during and after synthesis and separation of these particles from the reactant needs further investigation.

The usual synthesis techniques for producing nano-scale particles include mechanical milling of solid phases, solution chemistry and vapor-phase synthesis. Nano-scale structured particles have also been synthesized by chemical techniques such as chemical precipitation, and sol-gel processing. Also, vapor deposition of nano-scale particles has been achieved by gas evaporation, laser ablation and sputtering. Each of the mentioned synthesis techniques provides its own particular specific advantages, but they also have the following individual disadvantages which require the search for an improved process for producing nano-scale particles. Mechanical milling allows contamination to the particles and a particle size of less than 100 nm can not be produced. Solution chemistry, vapor phase synthesis, chemical precipitation, sol-gel processing and vapor deposition are processes that are very slow and are difficult to control in order to acquire a desired size and shape of the nano-scale particles to be produced. Many of these synthesis techniques also require the use of a vacuum unit and involve environmental concerns about chemical waste disposal.

Nanocrystalline materials find many applications in chemical, biological, metallurgical, electronic and ceramic industry. For example, nano-crystalline silver particles are used in the fabrication of solder paste, dental paste, thick film conductors for electronic circuits, jet printer and high speed photographic films. Nano-clusters of ruthenium are used as a seed for the nucleation and growth of organic molecules for DNA analysis. Nanometer sized palladium clusters are often used as catalysts and advanced electronic materials. Nano-clusters of cobalt are used in magnetic recording media and in the construction of permanent magnets.

It is an objective of the present invention to increase the quality and synthesis rate of nano-scale particles by laser-liquid interaction. It is also the objective of the present invention to provide improved control of the size of nano-scale particles to be produced. It is further the objective of the present invention to provide and apparatus and process to produce nano-scale particles that are more economical, cost effective and environmentally compliant.

SUMMARY OF THE INVENTION

The present invention is a process and apparatus for producing nano-scale particles and tubes using the interaction between a laser beam and a liquid precursor solution. There are two embodiments of the process. The first embodiment includes the use of a solid substrate during the laser-liquid interaction. In this embodiment the laser beam is directed at the solid substrate which is immersed in the liquid precursor solution and rotating. The apparatus used includes a reactive chamber which allows the entrance of the laser beam and a rotating specimen holder driven by an external or internal drive source. The laser beam interacts with the solid substrate through the liquid precursor solution converting the laser beam to thermal and photon energy. During the laser-liquid-solid interaction, the molecules of the liquid precursor solution undergo photofragmentation. These molecules absorb laser photons and are raised to an unstable excited state. The molecules release excess energy by splitting into fragments. The dissociation of the molecules by splitting results in the formation of nano-scale particles. After the photon dissociation of the liquid precursor molecules, the heat generated in the localized irradiated area of the solid substrate results in the growth of the nano-scale particles.

The second embodiment includes the use of a plasma during the laser-liquid interaction. In the second embodiment, a mixture of a liquid precursor and a carrier gas is injected into a laser beam. Injection of the mixture can be performed either perpendicular or parallel to the laser beam. The apparatus for injecting the liquid precursor and carrier gas into the laser beam includes a plasma nozzle designed to allow the laser beam to enter the plasma nozzle so that the laser beam may irradiate what is flowing through the plasma nozzle to create a plasma flow. The carrier gas allows for the formation of a plasma by its interaction with the laser beam. The liquid precursor is allowed to atomize into fine droplets. These fine droplets are exposed to the laser beam along with the plasma. The photon energy from laser beam and plasma energy induce the breaking of the molecular bond of the liquid precursor which results in the formation of ultra-fine elemental powders. A collection chamber is used to collect the nano-scale particles and is vented to release the remaining gases.

DESCRIPTION OF THE PREFERRED EMBODIMENTS

The present invention provides for the synthesis of nano-scale particles from a liquid precursor by a laser-liquid interaction. The use of the present invention allows a high quality of nano-scale particles to be produced at a higher rate; allows better control of particle size; and provides a synthesis process that is more economical and cost effective than prior synthesis techniques.

Figure 1:
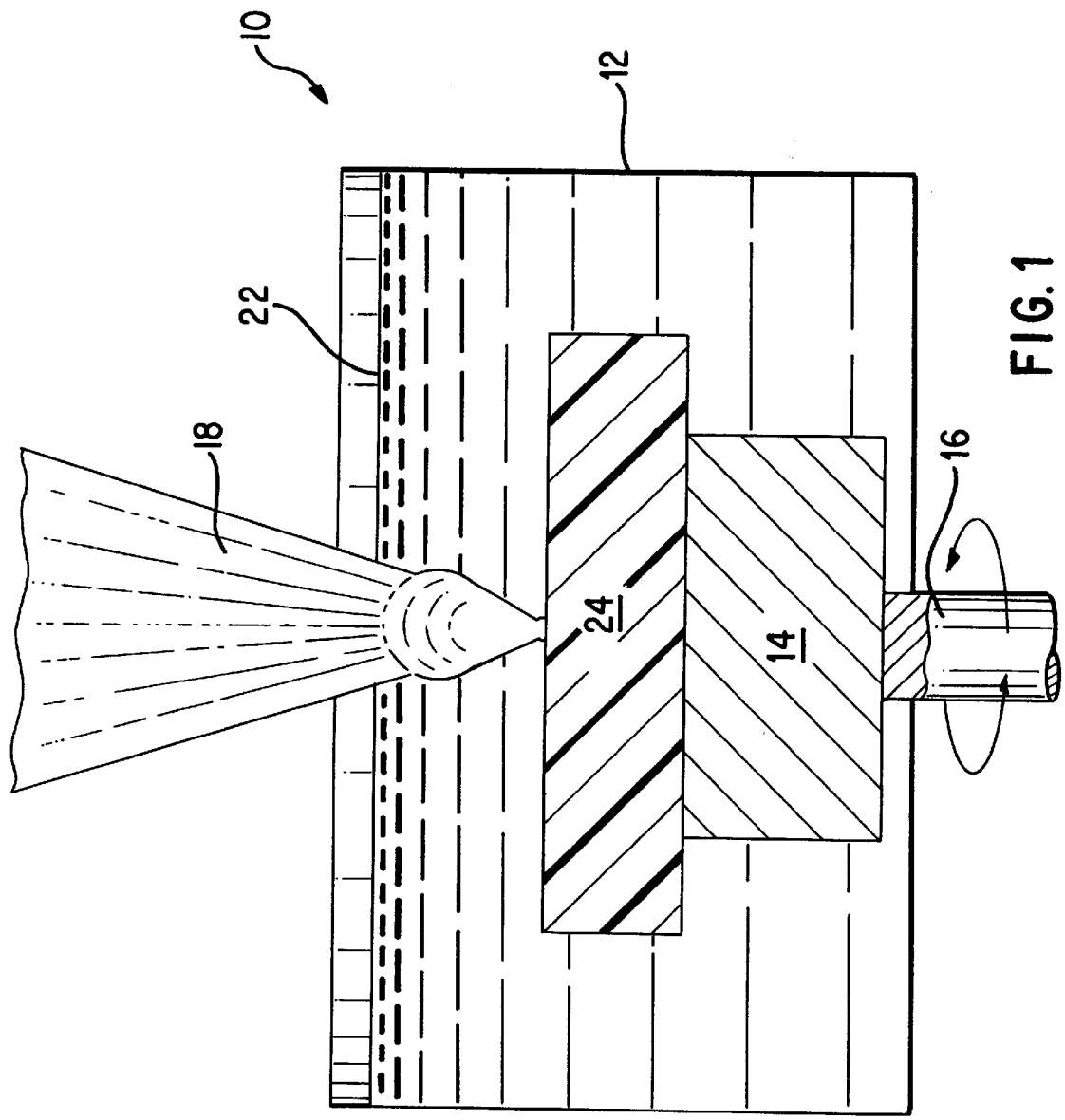
FIG. 1 is a schematic view of the apparatus used in the first embodiment of the present invention.

A first embodiment of the present invention is shown in FIG. 1. FIG. 1 is a schematic diagram of an apparatus 10 used in the first embodiment of the present invention for the production of nano-scale particles by laser-liquid-solid interaction. The apparatus includes a reactive chamber 12 which can be of an open or closed type. The reactive chamber 12 includes a specimen holder 14 which is rotatable within the reactive chamber 12. The specimen holder 14 is rotated by a drive source 16 which can be internal or external to the reactive chamber 12. If the reaction chamber 12 is of a closed type, there must be an opening or port to allow the entrance of a laser beam 18 from a laser (not shown).

To produce the nano-scale particles using the apparatus of the first embodiment, a liquid precursor solution 22 is placed in the reaction chamber 12. A solid substrate 24 is immersed in the liquid precursor solution 22 and secured to the specimen holder 14. The solid substrate 24 is aligned on the specimen holder 14 to be irradiated by the laser beam 18 from the laser. The solid substrate 24 is chosen to be non-reactive or at least minimally-reactive with the liquid precursor solution 22. The laser beam 18 interacts with the solid substrate 24 through the liquid precursor solution 22 converting the laser beam 18 to thermal and photon energy.

During the laser-liquid-solid interaction, the molecules of the liquid precursor solution 22 undergo photofragmentation. These molecules absorb laser photons and are raised to an unstable excited state. The molecules release excess energy by splitting into fragments. The dissociation of the molecules by splitting results in the formation of nano-scale particles. After the photon dissociation of the liquid precursor molecules, the heat generated in the localized irradiated area of the solid substrate 24 results in the growth of the nano-scale particles. The continuous rotation of the solid substrate 24 by the specimen holder 14 during laser-liquid interaction with the laser beam 18 distributes the powder nano-scale particles formed in the irradiated solution and prevents agglomeration due to continual interaction with the laser beam 18. The synthesized nano-scale particles are then separated from the solution, after removal from the reaction chamber 12, by conventional separation techniques (e.g. a centrifugal separator).

This laser beam-liquid-solid interaction technique of the first embodiment for the production of ultra fine particles eliminates many of the disadvantages of the previously mentioned synthesis techniques. The nano-scale particles produced by this laser-liquid interaction technique are highly spherical and are homogeneous in size. Under these conditions, the nucleation is homogeneous, i.e., the nuclei appear spontaneously. The size of the nano-scale particles can be varied depending upon the laser processing conditions which include laser beam power, beam diameter, focus condition, laser interaction time and the concentration of the reaction solution. Highly spherical particles of many metals in the nano-scale regime can be produced by the careful optimization of the laser process conditions.

The type of laser beam is not particularly limited and may be any laser beam that can cause the liquid precursor solution to undergo photofragmentation. $CO_2$ and YAg lasers are two examples of suitable lasers for use in the present invention.

The liquid precursor solution is also not particularly limited. All that is required is a solution containing the desired metal(s) in solution. It typically comprises salts of the desired metal or metals that are soluble in water or organic solvents. One skilled in the art could readily select available soluble metal salts containing the desired metal(s) such transition, rare earth, and noble metals. Specific examples of particles that can be produced by the present process include silver, gold, platinum, palladium nickel, tin, iron, copper, zirconium and vanadium as well as the alloys and oxides thereof including $SnO_2$, $Fe_2O_3$, $V_2O_5$, $Cu_2O$, Ag—Pt, Ag—Pd and Ag—Ni.

The specific substrate used in the present invention is also not particularly critical and can be any substrate that is a sufficient thermal conductor and allows for the formation of the particles by laser-liquid interaction described above.

Figure 2:
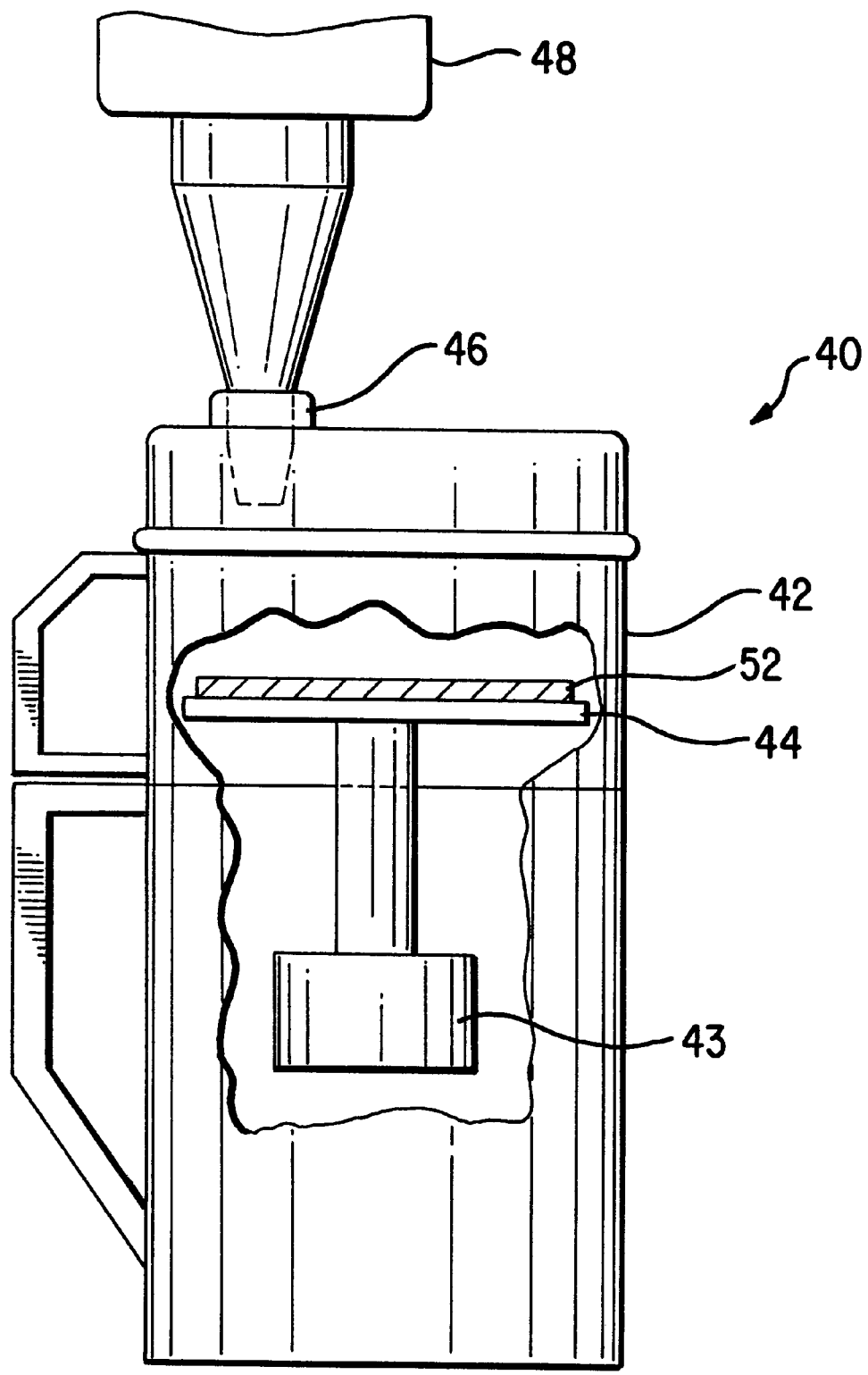
FIG. 2 is a side view of the apparatus used for experimental production of nano-scale particles using the process of the first embodiment of the present invention.

Experimental Production of Silver Nano-scale Particles using the First Embodiment The following will describe the experimental production of silver nano-scale particles using the technique and apparatus of the first embodiment. For this experiment a typical food processor 40 was used as a reaction chamber 42 and drive source 43 to rotate the specimen holder 44 as shown in FIG. 2. The specimen holder 44 was a disc with a cutout in the center so that it could be attached to the drive 43 of the food processor 40. A stainless steel substrate 52 was placed on the rotatable specimen holder 44. An opening 46 in the food processor 40 was used to insert the laser 48. The liquid precursor solution used was silver nitrate ($AgNO_3$) dissolved in distilled water. The reaction chamber 42 was filled with the liquid precursor until it was about three to four millimeters above the stainless steel substrate 52. While the stainless steel substrate 52 was rotated by the specimen holder 44, it was irradiated by a laser beam from laser 48. Rotation speed of the specimen holder 44 was about 700 revolutions per minute. A CW $CO_2$ laser having laser-beam power of 275, 300 and 400 watts at focus and defocused conditions was used. The laser beam diameter was 3 mm and the interaction time with the stainless steel substrate 52 was three to seven minutes. The synthesized silver nano-scale particles were separated from the solution by a centrifugal separator at 12,000 rpm.

The results for the experimental production of synthesized silver nano-scale particles were characterized by the following various techniques. X-ray diffraction results were carried out using Cu $K_\alpha$ radiation with a single crystal monochromator. Characteristic Bragg diffraction angles in the x-ray diffraction profile obtained from the Ag-powder sample were compared with the Ag-standard diffraction profile. The size, shape, and distribution of the nano-scale particles produced were examined using the JEOL JSM-6300F high resolution scanning electron microscope (SEM) equipped with a field emission gun. The microchemistry of the nano-scale particles were determined using Cameca SX-50 electron microprobe equipped with an energy dispersive spectrometer. The wavelengths and energies of the x-rays characteristic of the elements in the powder sample were measured and the elements present were identified.

Figure 3:
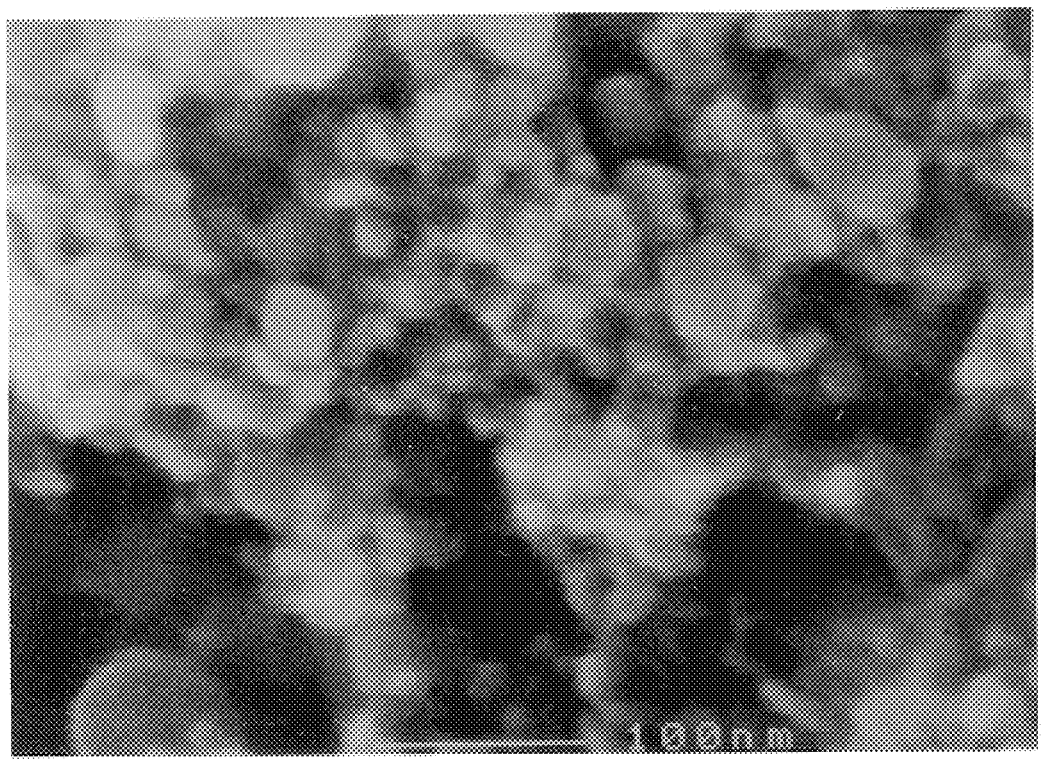
FIG. 3 is a SEM micrograph of the nano-scale crystalline silver particles using the first embodiment of the present invention.
Figure 4:
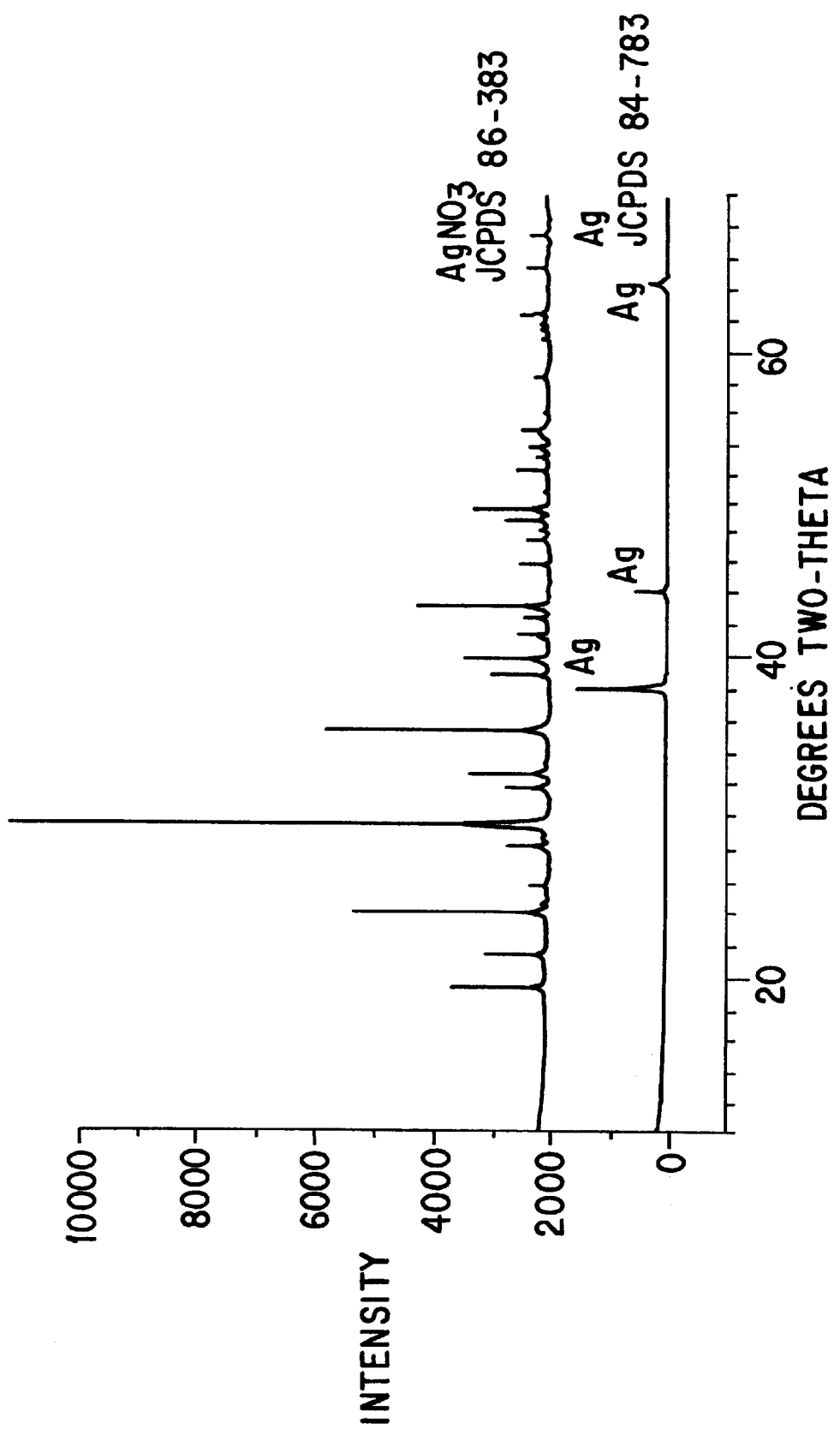
FIG. 4 is a graph of the corresponding x-ray diffraction pattern obtained from the powder produced using the first embodiment of the present invention.
Figure 5A:
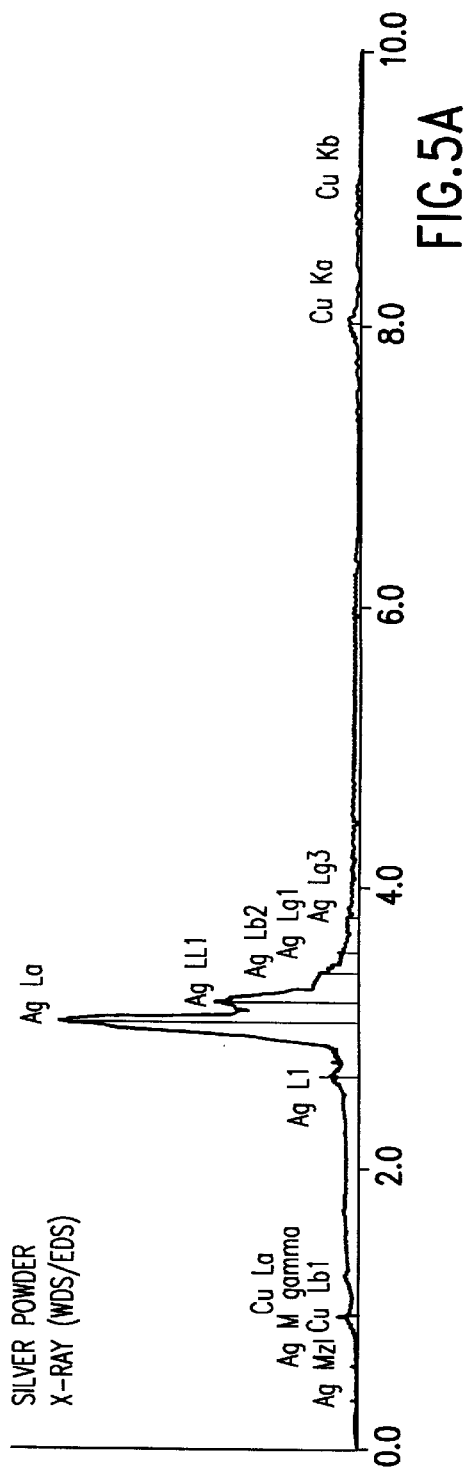
FIG. 5 is a graph of the x-ray microchemical data obtained from the silver nano-scale particles produced by the first embodiment.
Figure 5B:
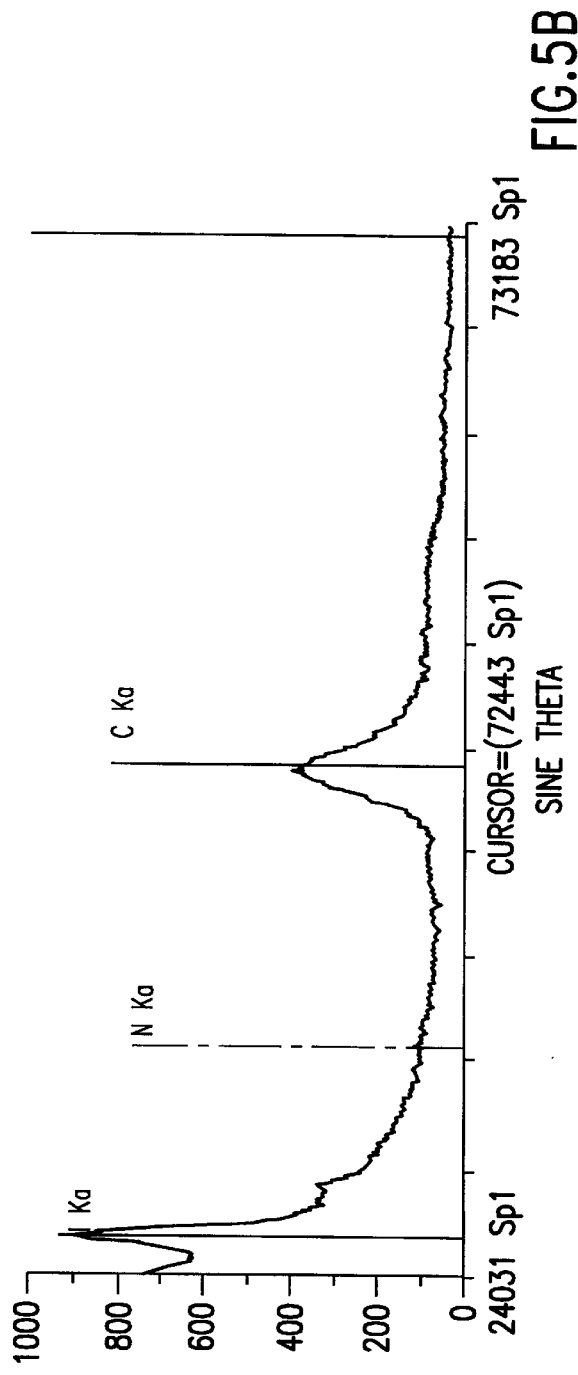

FIG. 3 shows the SEM micrograph of the nano-scale crystalline silver particles synthesized from the silver nitrate solution using a focused CW $CO_2$ laser beam at a power of 275 watts and an exposure time of three minutes. The average size of nano-scale particles is about 20 nm. The corresponding x-ray diffraction pattern obtained from the powder is displayed in FIG. 4 indicating that the silver nano-scale particles are crystalline in nature. FIG. 4 also shows an x-ray diffraction pattern taken from the anhydrous silver nitrate crystals (starting material). The same Ag-powder sample was further examined in the electron microprobe. The x-ray microchemical data obtained from the nano-scale particles using the electron microprobe is shown in FIG. 5. The characteristic peaks from the elemental silver have been identified. The absence of characteristic peaks from nitrogen and oxygen indicates that the powder particles produced are free from oxygen (i.e., oxide formation) and nitrogen. Thus, high quality nano-scale silver particles were formed by this novel laser-liquid interaction technique.

Figure 6A:
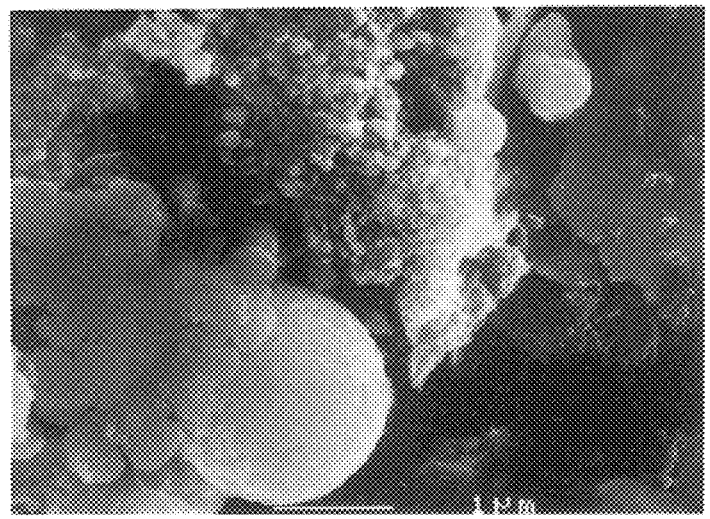
FIG. 6 are the SEM micrographs of the nano-scale crystalline silver particles produced during experimental use of the first embodiment from a silver nitrate solution using a focused CW $CO_2$ laser beam at a power of 300 watts and an exposure time of three minutes.
Figure 6B:
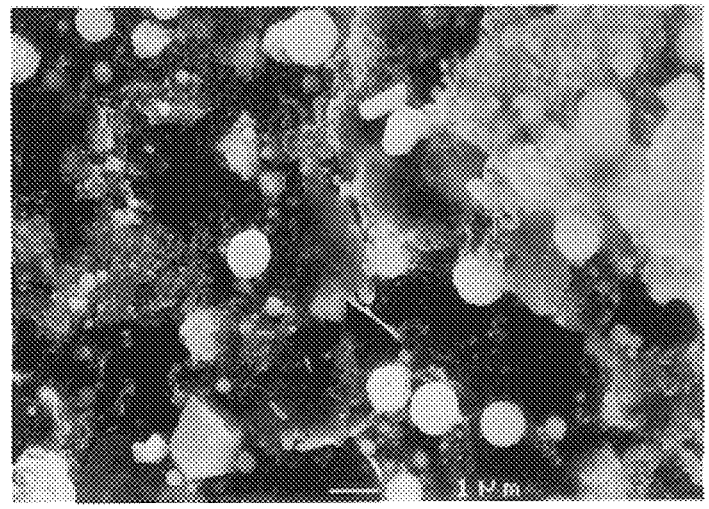
Figure 6C:
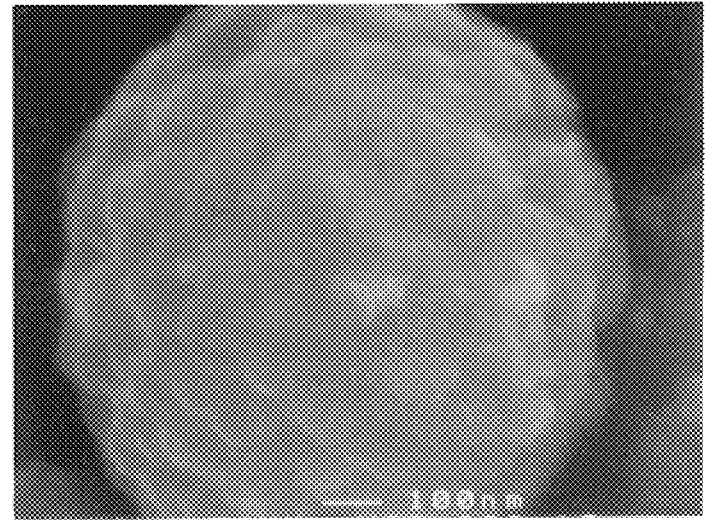

FIG. 6 shows the SEM micrographs of the nano-scale crystalline silver particles produced from the silver nitrate solution using a focused CW $CO_2$ laser beam at a power of 300 watts and an exposure time of three minutes. Relatively large nano-scale spherical particles were synthesized in the size ranging from 100 to 1000 nm. In addition, agglomerated nano-scale particles have also been produced under these processing conditions.

Figure 7A:
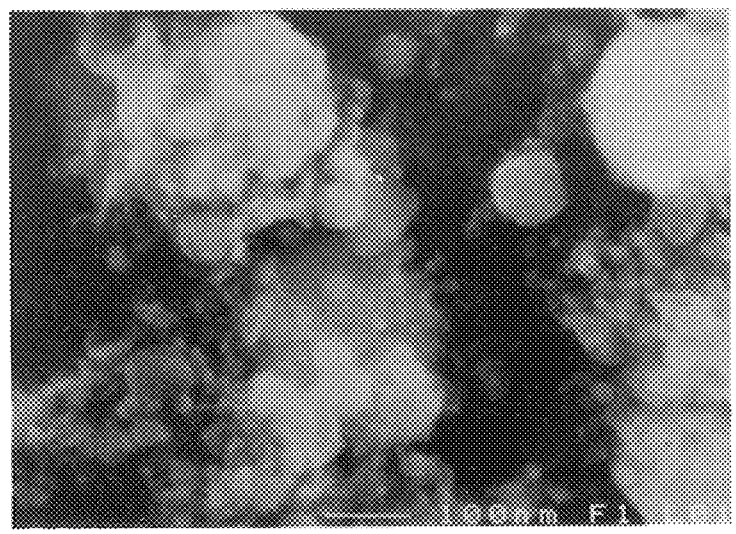
FIG. 7 are the SEM micrographs of the silver particles produced during experimental use of the first embodiment at a beam power of 300 watts and an exposure time of seven minutes.
Figure 7B:
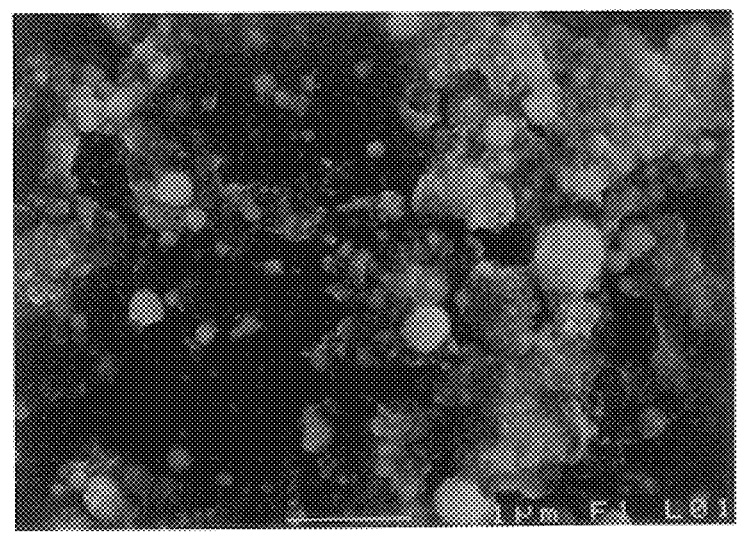
Figure 7C:
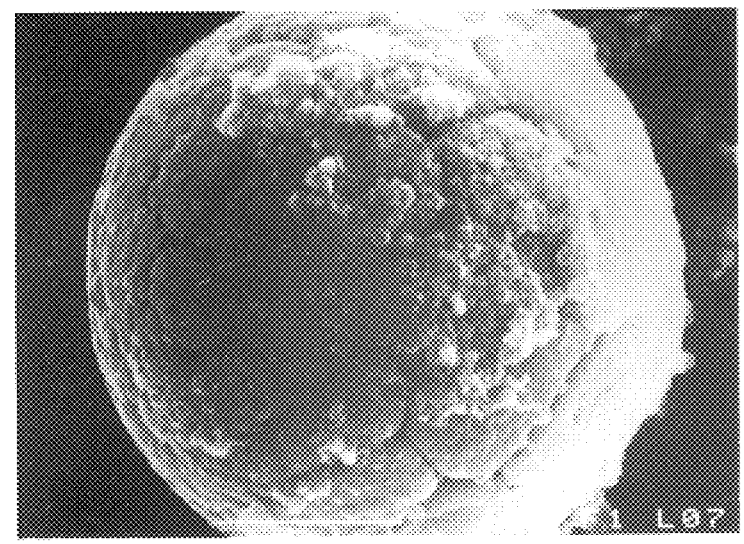

FIG. 7 shows the SEM micrographs of the silver particles produced at a beam power of 300 watts and a longer exposure time of seven minutes. The major portion of the nano-scale particles produced is an agglomerated mass along with some spherical particles in the size range of 100 to 1000 nm. This can be explained by the fact that higher exposure time resulted in the interaction of the laser beam with the nano-scale particles which caused agglomeration.

Figure 8A:
FIG. 8 are the SEM micrographs of the nano-scale crystalline silver particles formed during experimental use of the first embodiment using a defocused $CO_2$ laser beam at a beam power of 400 watts and an exposure time of three minutes.
Figure 8B:
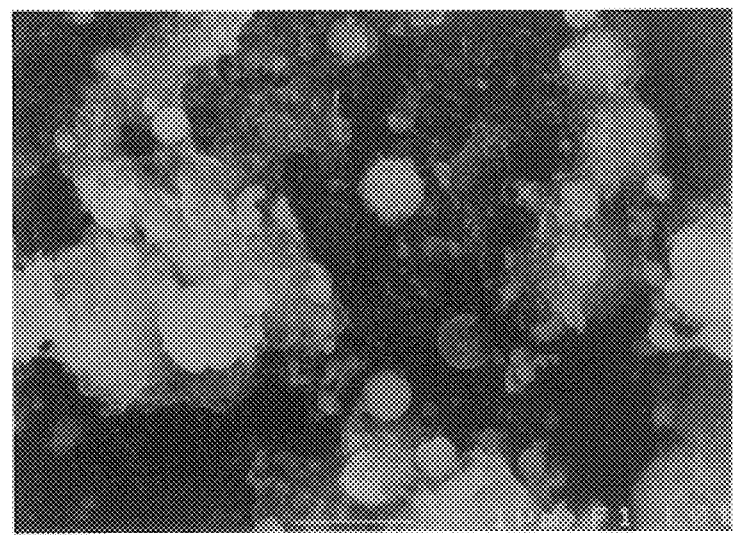
Figure 8C:
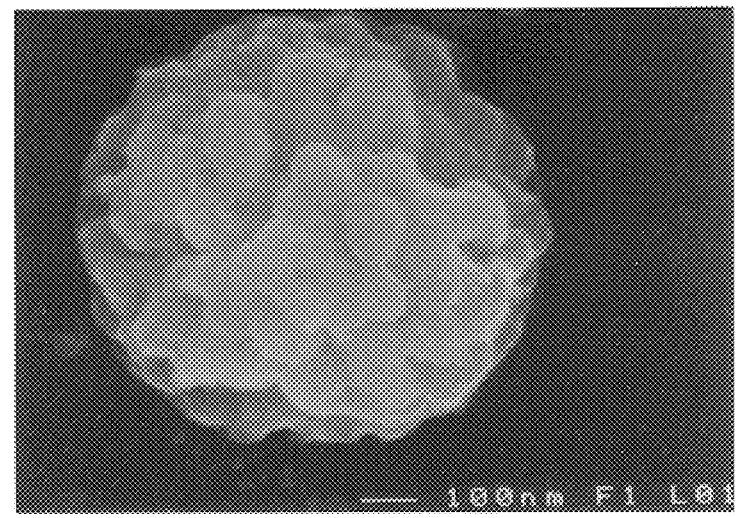

FIG. 8 shows the SEM micrographs of the nano-scale crystalline silver particles formed by this technique using the defocused $CO_2$ laser beam used at a beam power of 400 watts and an exposure time of three minutes. Recirculation of the solution was used to produce these powder particles.

It can be seen from the microstructure that due to re-exposure of the reaction solution to the laser beam, subsequent nucleation and growth of new spherical particles on the particles already formed has taken place. This results in the production of powder particle clusters in the size range of 100 to 1000 nm which consist of several layers of spherical particles. The formation of such clusters of spherical particles can be explained as follows. A spherical particle that formed already by the nucleation and growth acts as a site for nucleation for several new spherical particles which are considerably smaller in size and is of the order of 10 nm. The shape of these special type particles is different from agglomerated particles produced by this technique.

By the first embodiment technique of laser-liquid interaction, high quality nano-scale crystalline particles were synthesized in the size range of 20 to 100 nm at a rate of 3–6 grams/minute. The size, shape synthesis rate and microstructure of silver nano-scale particles were found to be dependent upon the laser processing conditions including laser energy, focus condition, chemical concentration of precursor solutions and interaction time, where the dissociation of silver nitrate molecules results in the formation of nano-scale silver particles and the remaining solution. The remaining solution can be used again to process more silver nitrate.

The successful production of nano-scale silver particles from the silver nitrate solution by the laser beam-liquid interaction method has been shown by this experimental model. Size of the nano-scale particles formed varied from 10 to 1000 nm depending upon the laser processing conditions which included laser beam power, beam diameter, focus condition, laser interaction time and the concentration of the reaction solution. The synthesis rate of nano-scale particles was found to be 5–6 grams per minute. X-ray diffraction and electron microprobe results from the nanoscale particles indicated that high quality silver particles were produced. Using the above mentioned experimental apparatus other nano-scale particles produced were Nickel (Ni), and Nickel (NiO) from a solution of nickel nitrate dissolved in distilled water and Iron oxide ($Fe_2O_3$) from iron nitrate dissolved in distilled water. It is believed that this process and results can be reproduced on a larger scale for commercial production of nano-scale particles.

In the second embodiment, a mixture of a liquid precursor and a carrier gas is injected into a laser beam. The carrier gas can be gases such as He, $N_2$, Ar, etc. This embodiment provides a production rate of making nano-scale particles that is very high and can be scaled-up. A vacuum unit is not required for this process and the process provides for recovery of many materials directly from liquid waste. The process also allows easy control of processing conditions and provides a high quality synthesis of nano-scale particles. Injection of the mixture can be performed either perpendicular or parallel to the laser beam. The setup for injecting the liquid precursor and carrier gas into the laser beam includes plasma nozzle designed to allow the laser beam to enter the plasma nozzle so that the laser beam may irradiate what is flowing through the plasma nozzle to create a plasma flow. The plasma nozzle used would be different depending on whether the injection of the mixture is perpendicular or parallel to the laser beam. The construction of such plasma nozzles is known and is not discussed in detail in this invention.

The carrier gas serves two purposes. The first purpose is that it forms a plasma by interacting with the laser beam. The size of the plume and energy of the plasma will be dependent upon laser processing parameters such as laser power, wavelength, precursor concentration, and interaction time. The second purpose is to atomize the liquid precursor into fine droplets These fine droplets are also exposed to the laser beam as well as the plasma. The photon energy from laser beam and plasma energy induce the breaking of the molecular bond of the liquid precursor which results in the formation of ultra-fine elemental powders. An example is $2AgNO_3 \rightarrow 2Ag+N_2+3O_2$. The size and rate of the ultra-fine elemental powder formation would be dependent upon the above mentioned laser processing conditions. In addition, it would also be dependent upon the flow rate and concentration of the solution and temperature of reaction zone (i.e., plume energy).

Figure 9:
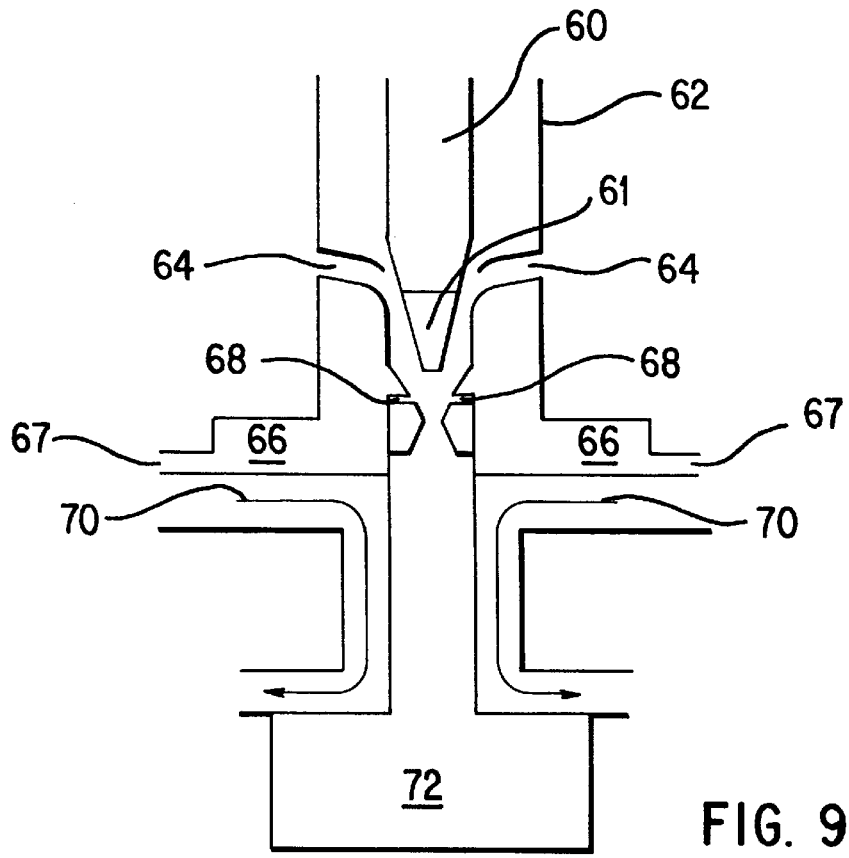
FIG. 9 is a schematic side view of an axial flow plasma nozzle used in the second embodiment of the present invention.

Parallel injection of the mixture requires the setup schematically shown in FIG. 9. FIG. 9 shows a laser 60 and laser beam 61 directed into an axial flow plasma nozzle 62. The carrier gas enters the system from gas input holes 64. The gas input holes 64 are formed to direct the gas downward along the path of the laser beam 61. Fluid feed holes 67 supply pressurized reservoirs 66 with the liquid precursor which in turn supply the liquid precursor to a small gap 68 formed around the nozzle. This allows the liquid precursor to atomize as it is injected into the nozzle 62. The gap 68 is formed so that the liquid precursor is directed along the path of the laser beam 61 and is in the order of size of eight thousands of an inch. The laser beam 61 is focused at the point where the liquid precursor enters the nozzle 62 to effectuate the process. Cooling channels 70 are used to allow a cooling fluid to flow around the nozzle 62 for cooling purposes. At the bottom of the nozzle 62 is a reservoir 72 for collecting the ultra-fine powder. The reservoir 72 is vented to release the remaining gases.

Figure 10:
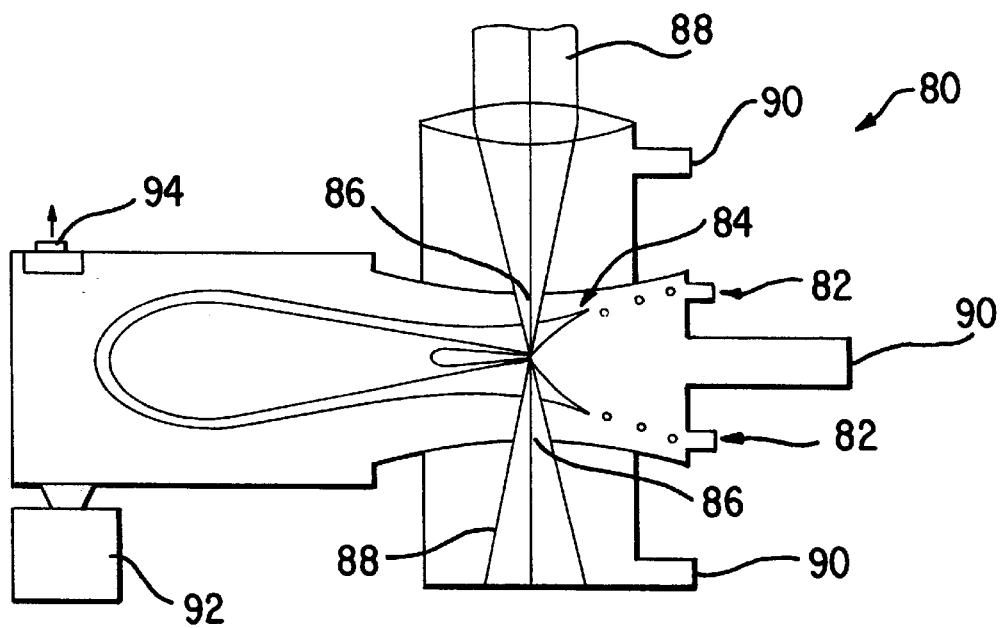
FIG. 10 is a schematic side view of a transverse flow plasma nozzle used in the second embodiment of the present invention.
Figure 11A:
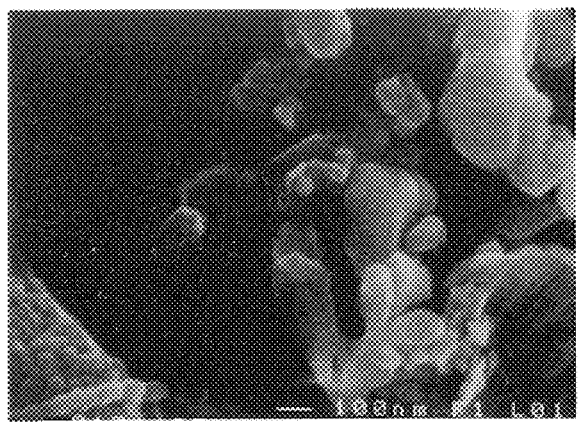
FIG. 11 are SEM micrographs of silver nano-scale particles synthesized from the silver nitrate solution using the second embodiment of the present invention.
Figure 11B:
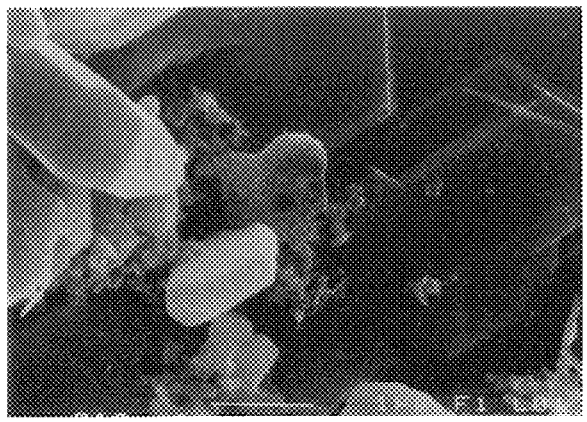
Figure 11C:
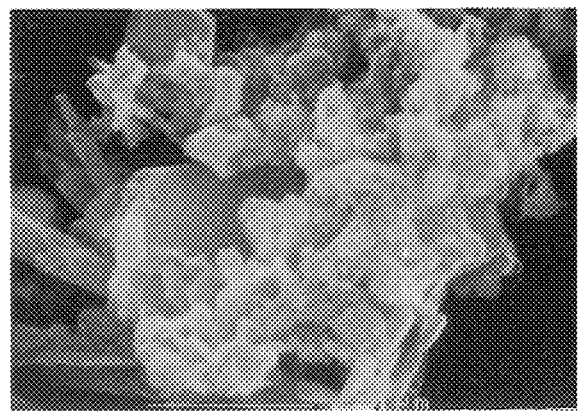
Figure 11D:
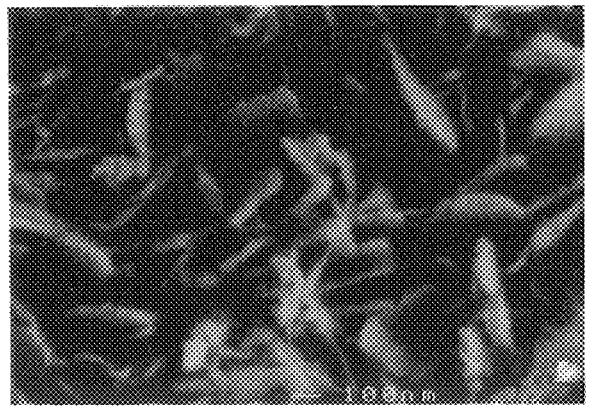

Perpendicular injection of the mixture requires the setup shown in FIG. 10. FIG. 10 schematically illustrates a transverse flow plasma nozzle 80. The plasma nozzle 80 includes two mixture inputs 82 for injection of the mixture of liquid precursor and carrier gas into a converging-diverging reaction chamber 84. The reaction chamber 84 has two aligned holes 86 at the mid-point of the reaction chamber 84 to allow the entrance of a laser beam 88 which is perpendicular to the flow of the mixture. The plasma nozzle 80 also has three gas inputs 90. Carrier gas of the type used in the mixture is injected in the gas inputs 90 to equalize the pressure in the reaction chamber 84 and force the mixture to flow from the reaction chamber 84 to a collection chamber 92. The laser beam 88 is focused at the flow of the mixture in the reaction chamber 84. Once the laser beam 88 has interacted with the mixture in the reaction chamber 84, the processed mixture flow continues into the collection chamber 92 where the ultra-fine powder settles to the bottom of the collection chamber 92 and the remaining gases are vented out a filter 94.

Figure 12:
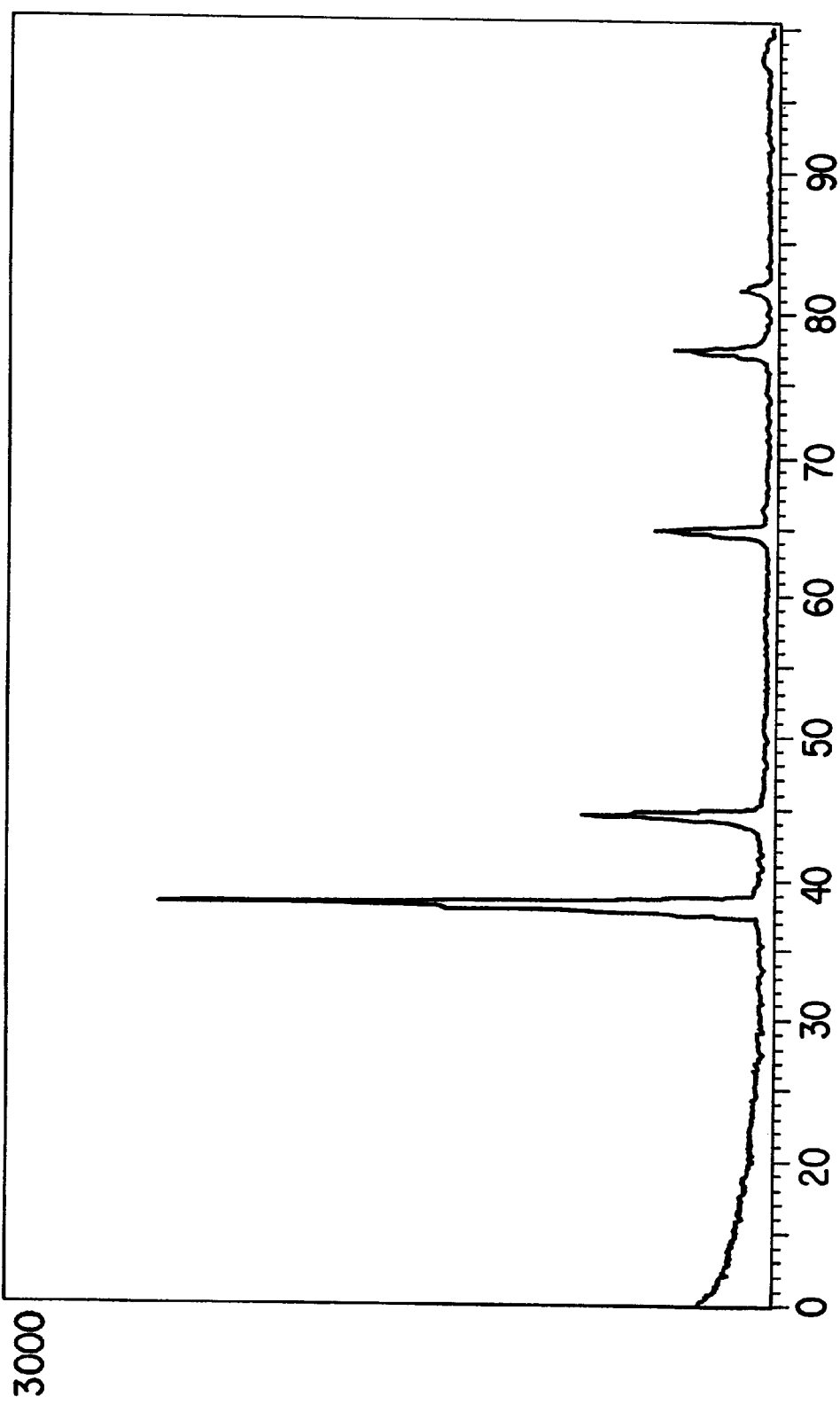
FIG. 12 is an X-ray graph from the bulk silver nitrate crystals as an initial starting material and silver nano-scale particles after synthesis using the second embodiment of the present invention.
Figure 13A:
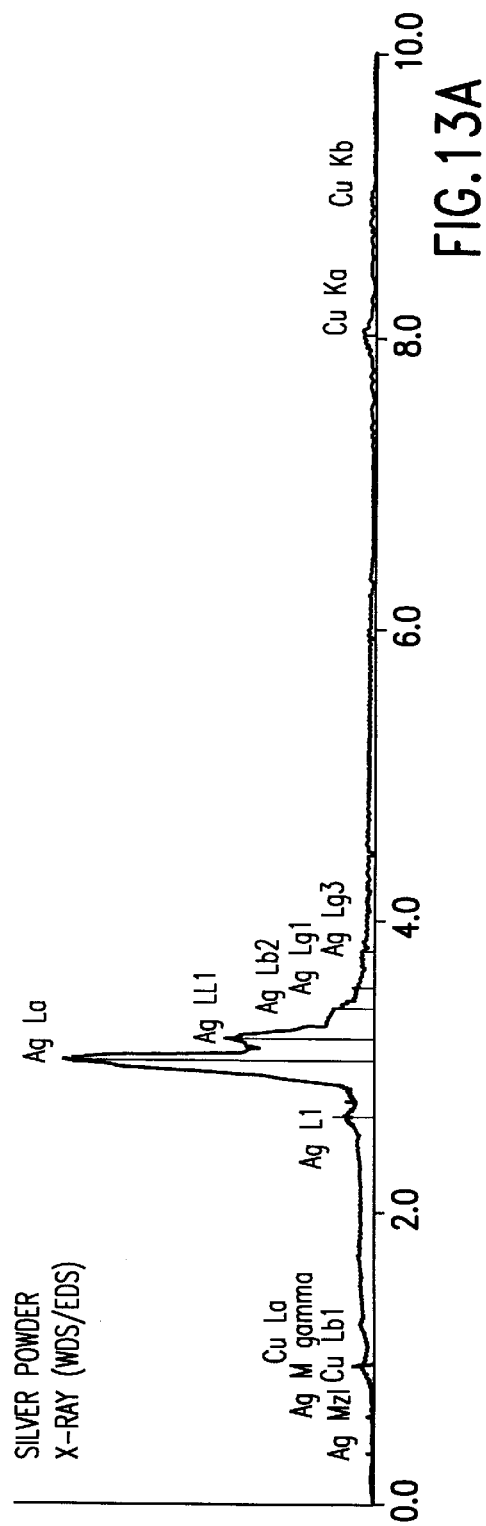
FIG. 13 is an X-ray (WDS/EDS) graph from the single silver nano-scale particles using the second embodiment of the present invention.
Figure 13B:
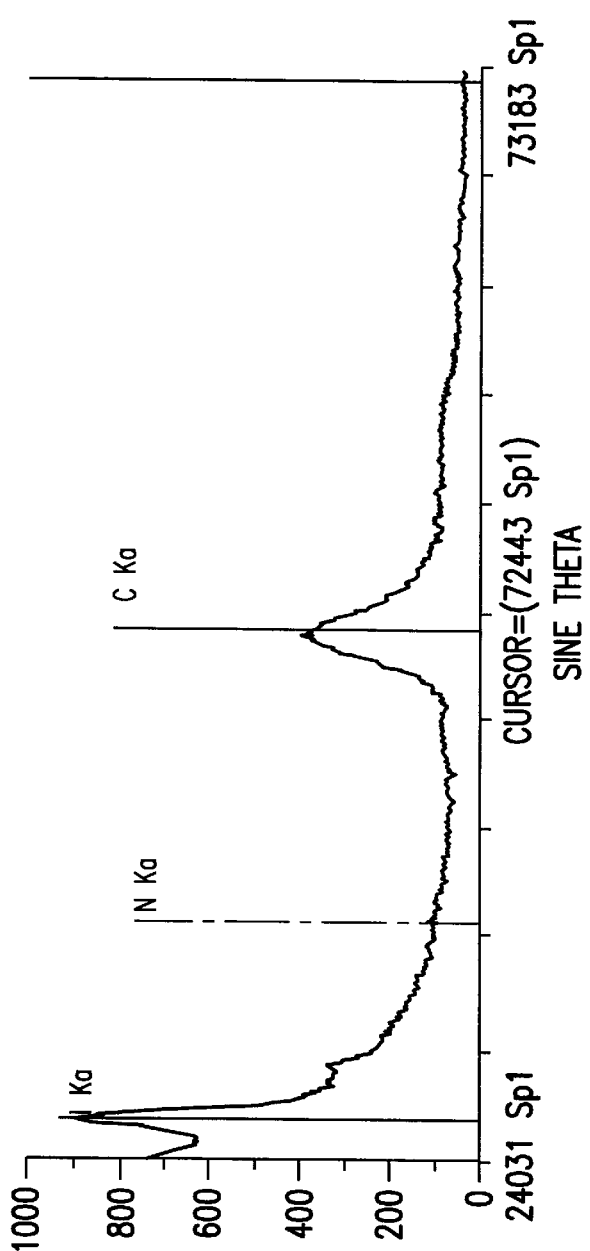
Figure 14:
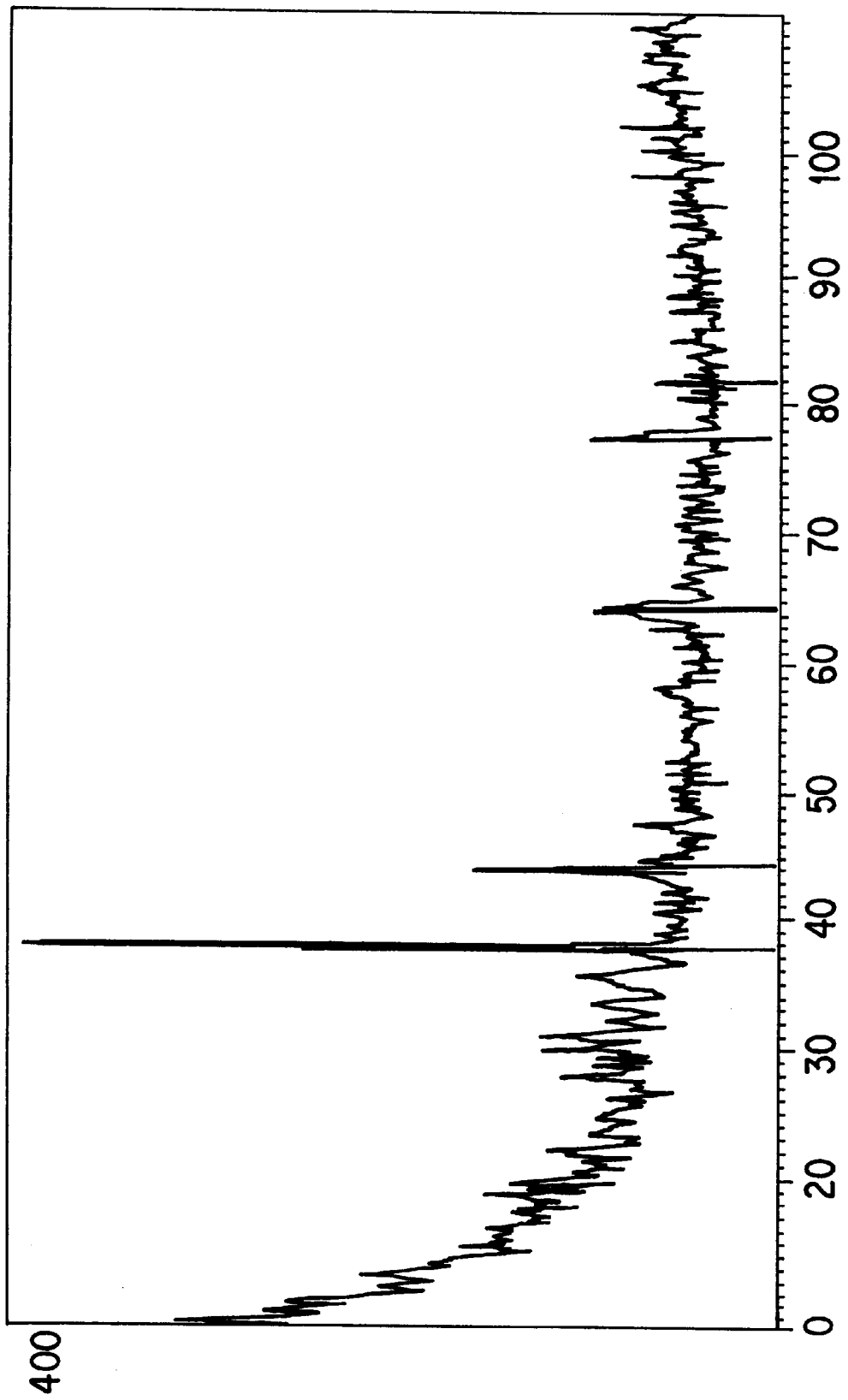
FIG. 14 is an X-ray graph showing the results during the recovery of silver particles from photographic waste solution.

Experimental Production of Silver Nano-scale Particles using the Second Embodiment A preliminary experiment was conducted using the perpendicular setup of the second embodiment for the synthesis of silver (Ag) nano-scale particles using silver nitrate $(AgNO_3)$ dissolved in water as the liquid precursor to the point of saturation of the solution. A continuous wave $CO_2$ laser (300 watts) was used for the dissociation of the silver nitrate solution. The reaction chamber converged from one hundred thousands of an inch to sixty thousands of an inch and diverged back to one hundred thousands of an inch. The input pressure of the carrier gas and the mixture at their respective inputs was sixty pounds per square inch. FIG. 11 shows SEM micrographs of silver nano-scale particles synthesized from the silver nitrate solution. The size of the silver particles varied from 10 to 50 nm depending upon the laser processing conditions (laser power, wavelength, precursor concentration, and interaction time). FIG. 12 shows an X-ray from the bulk silver nitrate crystals as an initial starting material and silver nano-scale particles after synthesis. FIG. 13 shows X-ray (WDS/EDS) from the single silver nano-scale particles showing a high grade of silver particles synthesized without forming any compounds of silver such as silver oxide, or nitride. This same setup was also used in the recovery of silver particles from photographic waste solutions as shown in FIG. 14. Similar results were obtained when the silver nitrate was dissolved in a glycol solution and similar results were also obtained when the parallel setup of the second embodiment was used.

Figure 15:
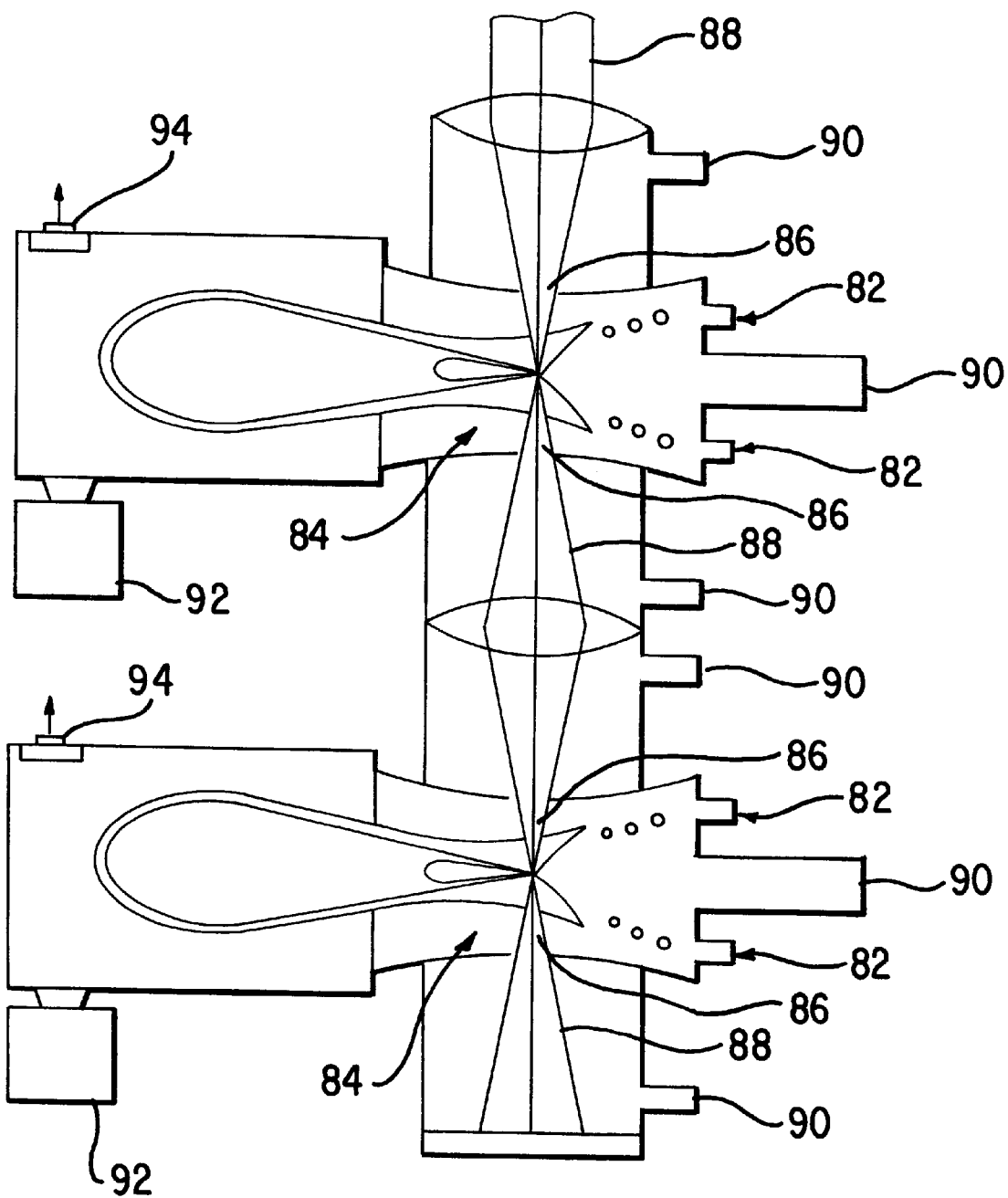
FIG. 15 is a schematic side view of a multi-station version of the apparatus used in the second embodiment of the perpendicular setup.

It is estimated that only ten percent of the total laser beam power available was utilized in the synthesis of the silver nano-scale particles using the perpendicular setup. Remaining laser power could be utilized by developing multi-stations in the synthesis of nano-scale particles as shown in FIG. 15. A lens 98 would be needed between each station to refocus the laser beam at the next reaction chamber 84. The multi-station set-up in the path of the laser beam would allow for the synthesis of varieties of materials simultaneously. It has been estimated that the cost of setting-up one work station including $CO_2$ laser having a power of 500 watts would be paid off by continuously running the setup for 24 hours. In addition, this process is environmentally compliant.

The second embodiment saves energy in the following three ways. First, this novel approach uses laser energy in the form of photon energy. It can be used in a closed loop, thus, laser energy can be redirected using multiple reflecting mirrors or forming multiple work stations as shown in FIG. 15, providing complete utilization of the laser beam. Second, processing or sintering temperature of the nano-scale particle materials depends upon its size. The smaller the desired size of the nano-scale particles, the lower the sintering temperatures, thus there will be direct saving of the energy. Finally, focused sun light can also be used as a form of energy to synthesize nano-scale particles from liquid precursor, which is a different source of energy.

Experimental Production of Nickel, Nickel-Oxide and Dual Phase Nickel/Nickel Oxide The experiments reported in this section utilized the apparatus of the first embodiment. The laser beam, directed at a substrate target submersed in the precursor solution, served to heat the substrate. The thermal conductivity of the substrate material controls the temperature at which the precipitation reaction occurs. The rotating substrate serves to agitate the solution. Three types of substrate materials were used in these experiments: copper, nickel and niobium.

Nickel nitrate hexahydrate dissolved into 2-ethoxyethanol forms the precursor solution. The 2-ethoxyethanol acts as both solvent and reducing agent. D-sorbitol was added to 2-ethoxyethanol solvent to determine the effect of a surfactant during laser-liquid interaction processing. Water was added to the 2-ethoxyethanol reducing agent to study the effect on the reaction process.

The solutions used for synthesis by laser-liquid interaction technique were nickel nitrate hexahydrate inorganic precursor in 2-ethoxyethanol ($C_4H_{10}O_2$)-based solvents. Nickel nitrate hexahydrate has a high solubility in 2-ethoxyethanol. Nickel nitrate hexahydrate was dissolved in 2-ethoxyethanol at various concentrations. The concentration of nickel nitrate prepared was 0.3 M, 0.6 M, and 0.8 M. To study the effect of water on the precipitation reaction, 0.6 M nickel nitrate hexahydrate solutions containing 50 volume percentage de-ionized water was prepared. The non-ionic surfactant d-sorbitol ($C_6H_{14}O_6$) was added to 0.6 M nickel nitrate hexahydrate solution in the amount of 0.2 M to vary the physical properties of the resulting particles. The solubility of the d-sorbitol in 2-ethoxyethanol was increased by adding a few drops of de-ionized water. Table 1 contains a list of the liquid precursor solutions used in this investigation.

TABLE 1

Solutions Processed by Laser-Liquid Interaction Technique

| Solution # | $Ni(NO_3)_2.H_2O$ Molar Concentration | 2-Ethoxyethanol Volume Fraction | Deionized Water Volume Fraction | D-Sorbitol Molar Concentration | Reduced Product |
|---|---|---|---|---|---|
| 1 | 0.3M, 0.6M, and 0.8M | 1 | 0 | 0 | Ni & NiO |
| 2 | 0.6M | 0.50 | 0.50 | 0 | NiO |
| 3 | 0.6M | 1 | 0 | 0.2 | Ni |

The radiation source used in the laser-liquid interaction processing technique was a continuous wave $CO_2$ laser with maximum power of 1.5 kW. Three substrate types used were copper, nickel, and niobium. These substrates were polished to a 6 micron finish prior to laser-liquid interaction processing. The laser power intensity ranged from 39.0 kW/cm$^2$ to 71.4 kW/cm$^2$. Solutions were irradiated for times from 0.5 minutes to 9 minutes. Nitrogen gas was used to purge the system during the processing. The laser beam diameter was estimated at 0.07 cm (+/–0.005 cm). The substrate rotation speed was constant at 400 rpm. Table 2 contains a compilation of the laser-liquid interaction processing conditions completed in this group of examples.

TABLE 2

Processing Conditions

| Solution # | $Ni(NO_3)_2.H_2O$ | Laser Power | Irradiation Time | Substrate | Product |
|---|---|---|---|---|---|
| 1 | 0.3 moles/liter | 51.9 kW/cm$^2$ | 2.0 minutes | Copper | Ni, NiO |
| 1 | | | 3.0 minutes | Copper | Ni, NiO |
| 1 | | | 6.0 minutes | Copper | Ni, NiO |
| 1 | | | 9.0 minutes | Copper | Ni, NiO |
| 1 | 0.6 moles/liter | 39.0 kW/cm$^2$ | 1.0 minutes | Copper | Ni, NiO |
| 1 | | | 3.0 minutes | Copper | Ni, NiO |
| 1 | | | 3.0 minutes | Nickel | Ni, NiO |
| 1 | | 51.9 kW/cm$^2$ | 0.5 minutes | Copper | Ni, NiO |
| 1 | | | 1.0 minutes | Copper | Ni, NiO |
| 1 | | | 1.5 minutes | Copper | Ni, NiO |
| 1 | | | 3.0 minutes | Copper | Ni, NiO |
| 1 | | | 1.0 minutes | Nickel | Ni, NiO |
| 1 | | | 3.0 minutes | Nickel | Ni, NiO |
| 1 | | | 1.0 minutes | Niobium | Ni, NiO |
| 1 | | | 3.0 minutes | Niobium | Ni, NiO |
| 1 | | 90.9 kW/cm$^2$ | 3.0 minutes | Copper | Ni, NiO |
| 1 | 0.3 moles/liter | 39.0 kW/cm$^2$ | 1.0 minutes | Copper | Ni, NiO |
| 1 | | | 3.0 minutes | Copper | Ni, NiO |
| 1 | | 51.9 kW/cm$^2$ | 1.0 minutes | Copper | Ni, NiO |
| 1 | | | 3.0 minutes | Copper | Ni, NiO |
| 1 | | 71.4 kW/cm$^2$ | 3.0 minutes | Copper | Ni, NiO |
| 2 | 0.6 moles/liter | 90.9 kW/cm$^2$ | 3.0 minutes | Copper | NiO |
| 3 | 0.6 moles/liter | 51.9 kW/cm$^2$ | 3.0 minutes | Copper | Ni |
| 3 | | | 3.0 minutes | Nickel | Ni |
| 3 | | | 3.0 minutes | Niobium | Ni |

The product powders were collected by centrifugation at 12,500 rpm using the IEC Centra MP-4 centrifuge for characterization. The product phases were determined by X-ray diffraction using the Philips X'pert X-ray diffractometer. Elemental analysis was completed by EDAX energy dispersive spectroscopy. The product morphology was examined using the JEOL6300 field emission scanning electron microscope.

Nickel and nickel oxide particles were synthesized from nickel nitrate solutions using the laser-liquid interaction technique. The reducing agent determines the crystalline phases formed in the precipitation process. Experimental data supports the existence of a threshold laser power between 13.0 kW/cm$^2$ and 26.0 kW/cm$^2$ below which no precipitation event occurs.

Studies using several reducing agents reveal a dependence in product crystalline phase and morphology. The phase determination results for laser-liquid interaction processing show the occurrence of partial reduction by the 2-ethoxyethanol reducing agent. Complete reduction is achieved by addition of d-sorbitol and water addition retards the reduction reaction. Factors found that effect mean particle diameters were precursor concentration, laser beam power, total irradiation time, and substrate material.

The product powders precipitated by the laser-liquid interaction process were single phase nickel, single phase nickel oxide, or dual phase nickel and nickel oxide. The product phase is selective to the reducing agent. Reduction of nickel nitrate hexahydrate by 2-ethoxyethanol using laser-liquid interaction processing resulted in the formation of dual phase nickel and nickel oxide powders. The particles synthesized are hollow, roughly spherical and contained many large pores in individual particles. Although similar to the polyol processing technique in that reduction of an inorganic salt precursor occurs in a liquid polyol solution, the morphology of particles produced by the laser-liquid interaction technique differ. Powders synthesized by the polyol processing technique were non-porous and nearly spherical and nickel oxide was not found to be a reduction product. Synthesis of nickel particles from a by spray pyrolysis using a nickel nitrate precursor under some conditions has yielded dual phase nickel and nickel oxide powders.

The powders produced were single phase nickel oxide upon addition of water to the 2-ethoxyethanol reducing agent. Powders isolated from this reducing agent crystallized as the bunsenite phase of nickel oxide. The nickel oxide particles produced by this technique have a spherical, hollow morphology. Small pores are evident at high magnifications. Consequentially, the reduction of nickel nitrate in the water containing solutions indicate that reduction to nickel oxide occurs due to the presence of water. To substantiate this, a reduction using only water was performed. This water reduction yielded powders which have a spherical morphology with surface scales. Energy dispersive spectroscopy determined that nickel and oxygen were present in these powders.

Nickel nitrate hexahydrate reduced to pure nickel by adding d-sorbitol to 2-ethoxyethanol. These results indicate that d-sorbitol assists in the reduction of nickel nitrate hexahydrate. These powders have a highly agglomerated nature. The agent, d-sorbitol, was added to the system to act as a surfactant by providing stearic hindrance to particle agglomeration. Comparison of the morphology of these powders to those previously obtained show a drastic difference from the equiaxed porous morphology previously achieved. This may indicate that d-sorbitol also acted as a surface active agent in the reaction process.

Dual phase nickel and nickel oxide powders reduced by the laser-liquid interaction processing technique using a 2-ethoxyethanol reducing agent served as the model system for testing the process parameters that affect particle size.

Effect of Total Irradiation Time

Particle growth occurs in the laser-liquid interaction synthesis of dual phase nickel and nickel oxide particles. Particles processed at 51.9 kW/cm$^2$ for total irradiation times of 1 minute, 1.5 minutes, and 3 minutes resulted in particles of average size of about 0.38 mm, 0.52 mm, and 0.65 mm respectively. Particle size increase with reaction time at isothermal reaction temperatures occurs in polyol processing. Because the substrate is rotating, thermal energy supplied by the laser beam to the substrate should result in constant temperature during the irradiation period and no particle growth. However particle growth in this system indicates that the laser beam energy couples with the substrate material to cause a continuing process resulting in higher temperatures in the system during the ensuing period of irradiation.

Particle growth in the laser-liquid interaction process is a non-steady state process. Assuming steady state particle growth in the 1 minute to 3 minute time interval would result in critical nuclei size of approximately 0.3 $\mu$m. This size is substantially larger than the acceptable size of a critical nuclei. These results imply high growth rates in nuclei smaller than 3 $\mu$m.

Effect of Substrate Thermal Conductivity

The dominant role of the substrate material thermal conductivity pyrolytic deposition is to facilitate thermal energy input to the system by local heating. Local heat transfer by the laser beam to the substrate material is typically observed for deposition from liquid solutions. Dual phase nickel and nickel oxide powders were synthesized using three substrate materials: copper, nickel, and niobium to determine the effect of substrate thermal conductivity on mean particle diameter. The substrate discs were 5 to 8 mm thick. The microstructure of the particles synthesized is the same for the three types of substrates. The mean particle size decreases as substrate thermal conductivity increases. These results support the assertion of particle nucleation and growth at the laser beam-substrate interface. The thermal conductivity of copper, nickel, and niobium is 4.01 W cm$^{-1}$ s$^{-1}$, 0.909 W cm$^{-1}$ s$^{-1}$, and 0.537 W cm$^{-1}$ s$^{-1}$, respectively. Substrate materials with a high thermal conductivity maintain lower temperatures at the laser beam-substrate interface because of rapid heat convection away from this interface. Particle growth is more dominant for substrate materials with a lower thermal conductivity and hence, higher temperatures at the beam-substrate interface. Others have reported smaller particle sizes for synthesis at higher temperatures attributed to increase in number of homogeneous nuclei formed during nucleation bursts at higher temperatures. However, during laser-liquid interaction processing, the number of homogeneous nuclei formed during the nucleation bursts is limited by volume of liquid precursor exposed to the locally high temperatures at the beam-substrate interface. Therefore, the growth step dominates at the higher reaction temperatures attained when using a substrate with a low thermal conductivity. For samples processed using a 0.6 moles/liter nickel nitrate hexahydrate solution using laser power of 51.9 kW/cm2 and a total radiation time of 1.0 minute, the average particle diameter produced was about 0.8 $\mu$m for niobium substrate, about 0.6 $\mu$m for nickel, and about 0.4 $\mu$m for copper.

Effect of Precursor Solution Concentration

Powders produced using nickel nitrate hexahydrate precursor solution show an increase in particle size with increase in precursor solution concentration. The mean particle diameter measurements were taken from scanning electron micrographs using standard procedures for calculating the harmonic mean. Particle size distribution data in terms of a histogram indicate a modal distribution. Experiments suggest that nickel nitrate hexahydrate concentration versus the cube of mean particle diameter fits a linear profile. The linear fit implies that particle nucleation and growth occurs with negligible particle agglomeration in these powders synthesized by the laser liquid interaction precipitation. Precipitation of colloidal silver by the polyol process resulted in the relationship between the mass of precursor solution and final particle diameter. For samples processed using a 0.6 moles/liter nickel nitrate hexahydrate solution and copper substrate using laser power of 51.9 kW/cm2 and a total radiation time of 3.0 minutes, the average particle diameter produced was about 0.12 $\mu$m, 0.21 $\mu$m, and 0.29 $\mu$m for precursor concentrations of 0.3, 0.6, and 0.8 moles/liter respectively.

Effect of Laser Beam Power

Samples were processed by laser-liquid interaction processing at laser powers of 39.0 kW/cm$^2$, 51.9 kW/cm$^2$, and 90.9 kW/cm$^2$. Our experiments suggest that there is a threshold laser power below which no precipitation reaction will occur. This threshold laser power for these experiments likely exists between 13.0 kW/cm2 and 26.0 kW/cm2. This threshold power is presumed to be attributed to a limit in the amount of laser generated heat conveyed to the substrate material by the irradiation process.

We claim:

1. A process for producing nano-scale particles comprising the steps of:

a. placing a substrate on a rotatable specimen holder that is inside a reactive chamber, where said specimen holder is rotatable by a drive source;

b. filling said reactive chamber with a liquid precursor solution to a level above said substrate;

c. rotating said specimen holder and therefore said substrate by engaging said drive source;

d. irradiating said rotating substrate and said liquid precursor solution with a laser beam thereby producing said nano-scale particles; and e. separating the particles from the irradiated liquid precursor solution.

2. The process as claimed in claim 1, wherein said particles are selected from the group consisting of silver, gold, platinum, palladium nickel, tin, iron, copper, zirconium, vanadium and oxides and alloys thereof.

3. The process as claimed in claim 2, wherein said specimen holder and said substrate are rotated at a range from 0 to 1000 revolutions per minute.

4. The process as claimed in claim 3, wherein said substrate and liquid precursor solution are irradiated for a time period of 3 to 7 minutes.

5. The process as claimed in claim 1 wherein the precursor solution additionally contains a surfactant.

6. The process as claimed in claim 1, wherein the precursor solution comprises a metal nitrate.

* * * * *